United States Patent
Bassett

[11] 3,811,632
[45] May 21, 1974

[54] CORE CHUCKS

[76] Inventor: Kirk W. Bassett, 9 Knollwood Rd., Paxton, Mass. 01612

[22] Filed: Oct. 1, 1971

[21] Appl. No.: 185,714

[52] U.S. Cl.................. 242/46.4, 242/72, 279/2
[51] Int. Cl.................. B65h 17/02, B65h 75/30
[58] Field of Search....... 242/68.2, 68.1, 68.3, 68.4, 242/72, 46.4, 46.5; 64/27 N, 27 M, 30 R; 279/1 R, 2

[56] References Cited
UNITED STATES PATENTS

| 3,593,933 | 7/1971 | Grashorn | 242/68.2 |
| 3,355,121 | 11/1967 | Wright | 242/68.2 |
| 3,477,794 | 11/1969 | Abbott | 242/72 |
| 3,007,652 | 11/1961 | Heckman | 242/72 |

Primary Examiner—John W. Huckert
Assistant Examiner—Edward J. McCarthy
Attorney, Agent, or Firm—Maurice R. Boiteau

[57] ABSTRACT

There is disclosed in the present specification a core chuck including a deformable outer sleeve of elastomer or equivalent material and a multi-lobar generally rigid internal actuator for expanding the sleeve as a result of relative angular motion in either direction between the sleeve and the actuator from their at-rest positions. The sleeve is non-cylindrical having a plurality of core engaging ridges and is compressible for initial insertion into the core.

8 Claims, 4 Drawing Figures

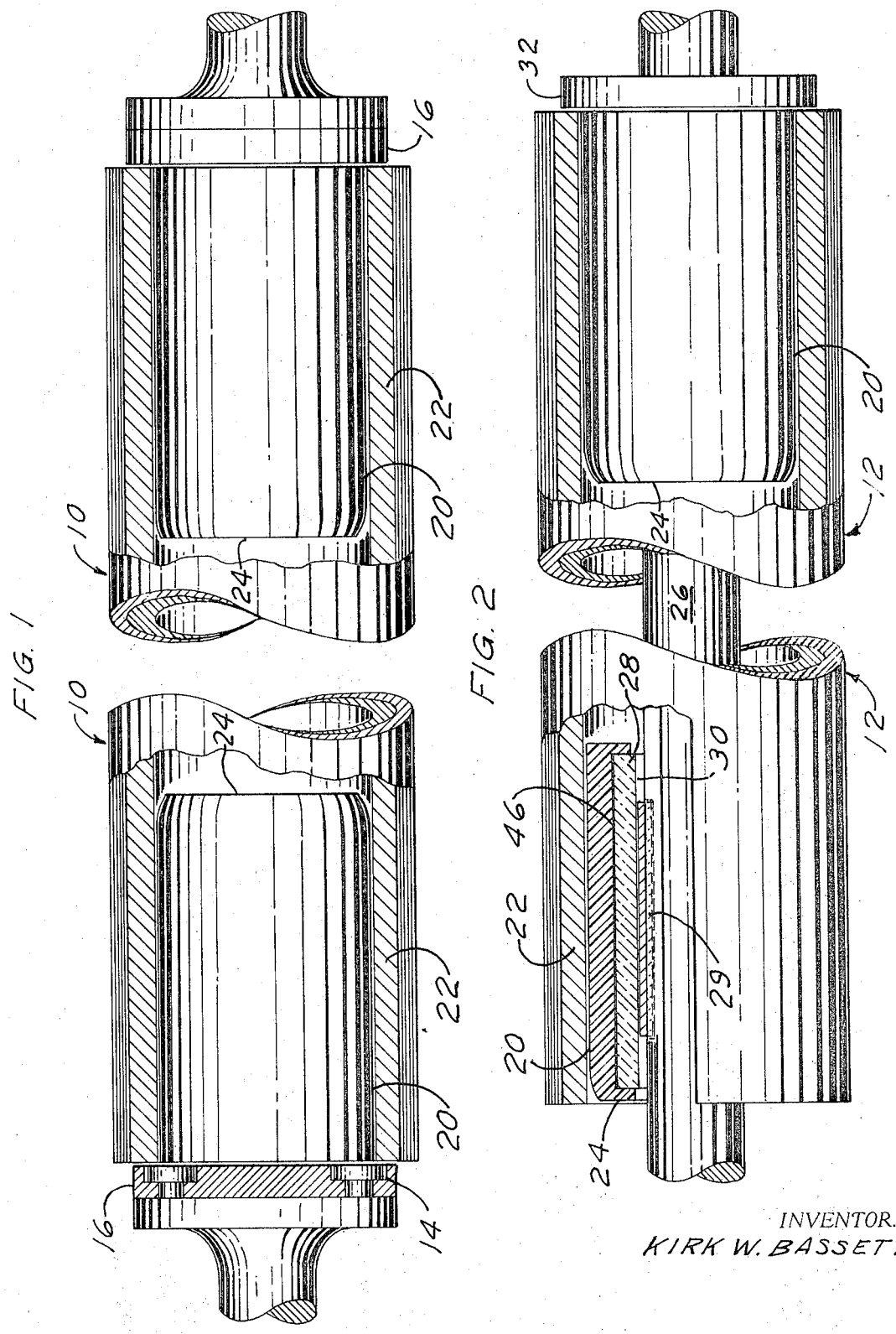

INVENTOR.
KIRK W. BASSETT

CORE CHUCKS

The present invention relates generally to core chucks and more particularly to such chucks employed for coupling rolls of web materials especially large heavy ones to driving or braking devices.

In the winding or unwinding of web materials such as paper, textiles, plastic film and the like, the web material is usually supported on a core generally of cardboard and the coupling of the driving device or brake is accomplished through the core. This is usually done by providing one or more core chucks which grip the core internally ordinarily near one or both ends. For greater durability, the portion of the core engaged by the chuck may be metal clad. The core chuck may be mounted singly or as one of a pair on an arbor passing through the core of the roll of web or alternatively flange-mounted, for example, on a stub shaft of a winding or unwinding machine.

When the roll being either wound or unwound is a large heavy one and the operation is being carried on at high speed, the coupling between the core and core chuck is frequently subjected to sudden changes in torque level and even to effective changes in torque direction which place severe requirements upon the gripping capacity of the core chuck. A very severe test, for example, occurs when it is necessary to stop a large unwinding roll soon after it has attained full operating speed. Typically in a web fed press application, the web roll may weigh 2,000 lbs. and be unwinding at the rate of 1,500 feet per minute. As the roll accelerates, the core chuck is gently entrained by the unwinding roll. However, should a sudden stop be required after reaching full speed, there is a tremendous increase in torque magnitude when a brake coupled directly to the core chuck is applied in order to stop the roll which tends to continue in motion. It is important under such conditions that there be a minimum of slippage between the core chuck and the core since any slippage tends to damage both the core and the core chuck. More importantly however, such slippage allows the web to move without tension control toward the press. At such speeds, large quantities of web are spilled onto the floor causing substantial losses of materials, requiring considerable clean-up labor and accounting for expensive machine down-time.

An important object of the present invention is to provide a core chuck adapted to transmitting very high torque in either direction and also suited to following sudden changes in torque direction.

Another object is to provide a core chuck in which the likelihood of damage to the core or to the chuck by excessive torque is substantially eliminated.

A further object is to provide a core chuck which may be economically manufactured and maintained and which will withstand a long life of severe usage.

Yet another object is to permit the mounting of core chucks on an arbor of maximum size for a given core diameter.

A still further object is to provide a core chuck having a broad expansion range while maintaining a high degree of torque coupling capability.

The foregoing objects are achieved by a core chuck including a flexible, expansible outer sleeve of a material such as a natural or synthetic rubber or elastomer and a relatively rigid multi-lobar actuator. According to a feature of the invention, the deformable sleeve in its at-rest condition is of non-cylindrical exterior shape, being radially relieved to provide a plurality of longitudinal ridges for initially engaging the interior of the roll core. According to a related feature, each of the ridges overlies a void between the sleeve and the actuator so that the ridges may be compressed somewhat to fit the interior of the core.

According to another feature of the invention, the shape of the actuator in close contact with the complimentary interior of the sleeve is such that a slight relative motion between the actuator and the sleeve causes the sleeve to expand and in doing so to assume the generally cylindrical shape of the core interior.

The foregoing objects and features of the present invention and many advantages derived from it will be more fully understood from the following detailed description of an illustrative embodiment taken in connection with the accompanying drawings in which:

FIG. 1 is a view in side elevation of a pair of core chucks according to the present invention, engaging the interior of a core, the chucks being of a flange-mounted type;

FIG. 2 is a view in side elevation of core chucks similar to those of FIG. 1 but mounted on a supporting arbor, one of the chucks being shown partially in section to illustrate its interior construction;

Figure 3:
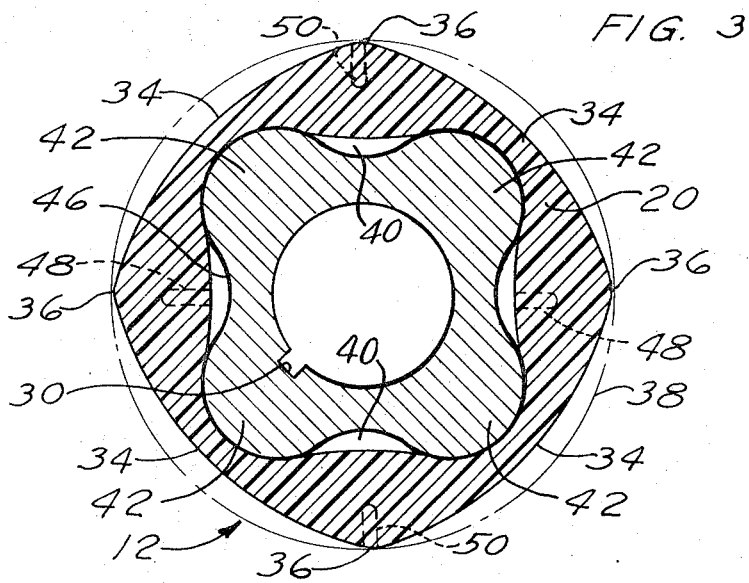
FIG. 3 is a view in cross-section of the core chuck shown in FIG. 2 with the arbor removed showing the sleeve in its at-rest position.

Turning now to the drawings, there are shown in FIG. 1 core chuck assemblies indicated generally at 10 and in FIG. 2 similar chuck assemblies indicated at 12. The chuck assemblies 10 and 12 are essentially alike except that the assemblies 10 are designed to be mounted directly upon a related machine by means of screws 14 passing through a flange 16 which is part of the chuck assembly 10 and engaging tapped holes in a matching flange of the related machine. The flange 16 is fixedly connected to an actuator 28 also forming a part of each chuck assembly 10.

Except for the detail of mounting, the chuck assemblies 10 and 12 are otherwise alike, each including a deformable sleeve 20 adapted to engage the interior of a core 22 upon which convolutions of paper or of other web are wound to form a roll. The sleeve 20 is formed at each of its ends with an integral lip 24, one of which is shown in FIG. 2. The lips 24 retain the sleeve 20 captive upon the actuator 28 and prevent the introduction of foreign matter to and the loss of lubricant from the interface between the sleeve and the actuator.

Before proceeding to the description of the operation of the chuck assemblies, it will be pointed out that the chuck assemblies 12 are mounted upon an arbor 26 each including a bored actuator 28 retained against rotation on the arbor by means of a key 29 in the arbor fitting a keyway 30 in the actuator. For endwise location of the arbor and chuck assemblies in the core 22, the arbor is provided with a stop collar 32.

As shown in FIG. 3, the sleeve 20 in its at-rest or unstressed condition is non-cylindrical having four major relief surfaces or flanks 34 terminating in crests or ridges 36 extending longitudinally the length of the sleeve 20. The relief provided by the surfaces 34 is seen from an examination of the spacing between the surfaces and a dot and dash line circle 38. In order to permit the sleeve 20 to be compressed so that the ridges 36 may be inserted into the core 22, a void 40 underlies each crest 36 between the sleeve 20 and the actuator 28 as seen in FIG. 3. In practice, the core chuck assembly 12 would be inserted into a core 22 having an interior diameter at least slightly smaller than the dimension over the crests 36 when the sleeve 20 is in its unstressed condition. The initial compression of the sleeve 20 in introducing the chuck into the core provides frictional resistance for retaining the sleeve against angular displacement in the core.

Figure 4:
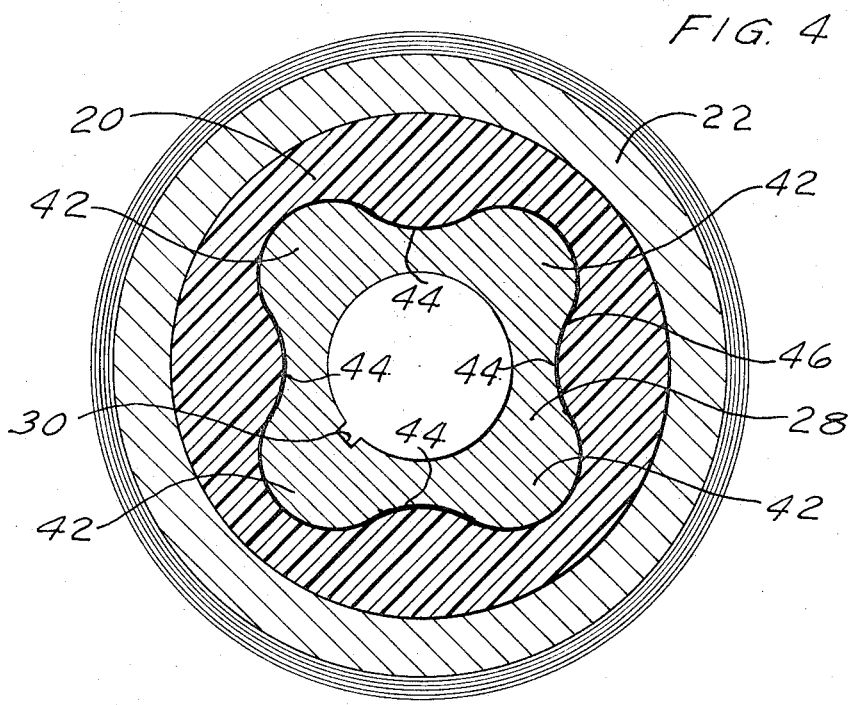
FIG. 4 is a view in cross-section similar to FIG. 3 but showing the sleeve in angagement with the interior of a core.

Assuming that the chuck assembly 12 has been inserted into a heavy roll which is unwinding in a clockwise direction as seen in FIG. 4, the initial compression of the sleeve 20 and the additional deformation resulting from the weight of the roll upon the sleeve cause the sleeve to rotate with the roll. As long as little resistance is applied to the actuator 28, the mass of the arbor 26, for example, the actuator 28 rotates the sleeve 20 with little additional deformation of the sleeve. However, when rotation of the actuator 28 is restrained such as by the application of a brake coupled to the arbor 26, the sleeve 20 tends to expand to fill the core 22 pressing forcefully against it as a result of the deformation caused by lobes 42 of the actuator 28, the sleeve 22 under these conditions being entrained by the web roll. When the actuator is restrained by the brake, interior enlargements 44 of the sleeve 20 are drawn into the narrow space between the lobes 42 and the core 22 thereby causing the sleeve to expand.

In order to assure slippage of the sleeve 20 over the actuator, the actuator particularly when the sleeve 20 is of a relatively hard material in a chuck assembly intended for a heavy web roll, is either lubricated or coated with a slippery material such as polytetrafluoroethylene (Teflon) as indicated at 46. The coating 46 may be applied in the form of tape or alternatively as a film molded in place. In the latter case, superior anchoring of the coating 46 is obtained if the actuator 28 is of aluminum and receives prior to the application of the Teflon coating a controlled surface oxidizing treatment. The combined oxidizing and Teflon coating process is commercially available.

Molded urethane because of its excellent properties of abrasion, and tear resistance, toughness, hardness range provides an excellent material for the sleeve 20. For very heavy web rolls the sleeve 20 may have a durometer hardness of as much as A 95, but the hardness is reduced to as little as A 60 for lighter web rolls which may weigh less than 100 lbs. In order that the sleeve 20 may be sufficiently flexible to be compressed for insertion into the core when made of a hard material, it may be internally slotted as shown at 48 in line with each of the ridges 36. Alternatively external slots 50 may be employed for the flexibility needed for insertion. This latter arrangement, especially when applied to a sleeve of one of the hardest materials, allows the sleeve to retain its interior surface in contact with the actuator. Otherwise, the thick portion of the sleeve is stiff and thus tends to deform the sleeve out of contact with a considerable part of the actuator contour. In addition to urethane, natural rubber and synthetic elastomers may be employed for the sleeve 20. Such materials as rubber-like plastics which are not truly elastomers may also be used either as unitary moldings or extrusions or alternatively as part of a laminate in which the exterior is clad with an appropriately resistive material such as fibers or textiles. The important characteristic of the material of the sleeve 20 is deformability from the relative movement between the sleeve and the actuator 28. Other desirable properties are toughness and wear resistance.

Although the actuator 28 has been shown with four lobes 42, it is obvious that it may be formed with either more or fewer lobes. The number of lobes and their shapes are determined in accordance with core size, web roll weight and operating speed but should be equally spaced to retain the inherent balance of the design. The lobes of the actuator may be made shallower and its minimum wall thickness reduced to adapt the chuck assemblies for mounting on a shaft of maximum diameter for a given core size.

The actuator 28 has been described as preferably of aluminum having an oxidized surface to which a Teflon coating is bonded. Obviously, the material of the actuator 28 may be some other conventional construction material suitable to the operating conditions. As depicted in FIGS. 3 and 4, the shape of the lobes combined with the troughs which define the voids 40 is sinusoidal since such a curve yields a favorable ratio of expansion to angular displacement of the sleeve 20. However, the lobes may have the shape of other common curves such as cycloids or circular arcs.

Having thus described my invention, what I claim as new and desire to secure by Letters Patent of the United States is:

1. A core chuck having an axis and adapted for coaxial coupling to a web roll in motion, said roll having a core comprising a unitary deformable outer sleeve having at least a major portion of its length of generally uniform cross section including in its unstressed condition relatively wide relieved longitudinal flanks and relatively narrow ridges spaced more widely from the axis than the relieved flanks and expandable for frictional engagement with the roll core and a multi-lobar rigid actuator disposed within the sleeve with each lobe at least partially embraced by the substance of the sleeve whereby relative motion between the actuator and the sleeve causes the sleeve to expand for internally gripping the core.

2. A core chuck according to claim 1 further characterized in that the sleeve is interiorly formed to define a void between the sleeve and the actuator underlying each ridge.

3. A core chuck according to claim 1 further comprising a slip producing means at the interface between the actuator and the sleeve including a film of polytetrafluoroethylene covering the actuator.

4. A core chuck according to claim 1 further characterized in that the sleeve is of an elastomer and the actuator is metallic.

5. A core chuck according to claim 4 in which the elastomer of the sleeve is a urethane.

6. A core chuck according to claim 5 in which the urethane sleeve has a hardness within the range of durometer A 60 to A 95.

7. A core chuck according to claim 1 further comprising means for retaining the sleeve on the actuator.

8. A core chuck according to claim 7 further characterized in that the retaining means comprises an integral lip on the sleeve, engaging the actuator.

* * * * *